United States Patent [19]

Fujimura et al.

[11] Patent Number: 4,766,451
[45] Date of Patent: Aug. 23, 1988

[54] PHOTOGRAPHIC FILM PACKAGE

[75] Inventors: Ikuo Fujimura; Kimiaki Nakada; Tsutomu Tanaka, all of Tokyo, Japan

[73] Assignee: Fuji Photo Film Co., Ltd., Kanagawa, Japan

[21] Appl. No.: 68,224

[22] Filed: Jun. 30, 1987

[30] Foreign Application Priority Data

Jun. 30, 1986 [JP] Japan ............................ 61-100488[U]
Jun. 30, 1986 [JP] Japan ............................ 61-100489[U]

[51] Int. Cl.$^4$ ............................................. G03B 17/08
[52] U.S. Cl. ...................................... 354/64; 354/174; 354/202; 354/288
[58] Field of Search ............... 354/174, 275, 288, 202, 354/64

[56] References Cited

U.S. PATENT DOCUMENTS

| | | | |
|---|---|---|---|
| 2,409,605 | 10/1946 | Bolsey | 354/275 |
| 3,502,013 | 3/1970 | Shimoda | 354/64 X |
| 3,782,259 | 1/1974 | Noble | 354/202 X |
| 4,033,392 | 7/1977 | Less | 354/64 X |
| 4,176,701 | 12/1979 | Welgan | 354/64 X |

Primary Examiner—Michael L. Gellner
Attorney, Agent, or Firm—Young & Thompson

[57] ABSTRACT

A photographic film package having at least a taking lens comprises a box-shaped internal film casing with its back open; a removable film cartridge containing a film therein, in the internal film casing; a box-shaped external casing enclosing the internal film casing tightly therein and which is provided with openings for exposing the taking lens and operation elements; and sealing sheets for covering the openings so as to maintain the inside of the film package moistureproof and/or waterproof.

16 Claims, 3 Drawing Sheets

PHOTOGRAPHIC FILM PACKAGE

BACKGROUND OF THE INVENTION

The present invention relates to a photographic film package, and more particularly to a photographic film package with a taking lens which comprises a rectangular box-shaped internal film casing containing a film therein and an external casing.

Photographers often carry a camera on trips, excursions or holidays, to take commemorative or souvenir pictures. However, because cameras are precision instruments and relatively massive and heavy, they are sometimes inconvenient to carry about. In addition to the inconvenience of carrying the camera, one often forgets to take the camera long. If in fact one takes no camera along but decides to take pictures at a resort or the like, it is expensive to buy a new camera on the trip. Even if the cost can be ignored, it is often hard to find a camera shop in the vicinity.

Accordingly, it would be quite desirable to be able to buy a low-cost photographic film package with a taking lens, which could be sold wherever photographic film is sold. Such a film package should be available as cheaply and easily as films everywhere and should be disposable after one use. The film package would, after exposure of all frames of the film, be forwarded to a photo-shop or lab-shop without removing the film. In the photo-laboratory, the exposed film would be removed and developed to make prints therefrom while the film casing with a taking lens but without the film would be scrapped. In veiw of the above, an essential requirement for such a disposable photographic film package is not only to be low in cost but also to be of such construction that it is easy to remove the exposed film from the film package in a photo-laboratory.

Also, such a film package should be moistureproof or even waterproof, despite its simple structure.

OBJECTS OF THE INVENTION

It is therefore an object of the present invention to provide a photographic film package with a taking lens, which is quite simple in structure and sufficiently cheap to be disposable.

It is another object of the present invention to provide a disposal photographic film package which is moistureproof or even waterproof.

It is a further object of the present invention to provide a disposable photographic film package from which the film can be easily removed.

SUMMARY OF THE INVENTION

In order to achieve the above and other objects of the present invention, the disposal photographic film package of the present invention comprises a rectangular box-shaped internal film casing with its back open, which removably contains a film cartridge therein, and a box-shaped external film casing encasing tightly the internal film casing therein.

According to a feature of the present invention, the internal film casing is provided with openings which receive therein operating members such as a shutter release button, a film advancing knob, and the like, in such a way that the operating members are substantially flush with the outer surface of the internal film casing. The flushness of the operating members with the outer surface of the internal film casing makes it easy to insert and package tightly the internal film casing in the external casing.

According to another feature of the present invention, the openings formed in the external casing for exposing various operating elements provided in the internal film casing can be sealed by removable moistureproof members.

According to a further feature of the present invention, the openings formed in the external casing for exposing the operating members in the internal film casing can be sealed by flexible waterproof members.

BRIEF DESCRIPTION OF THE DRAWINGS

These and other objects and features of the present invention will become apparent from the following description taken in conjunction with the preferred embodiments thereof with reference to the accompanying drawings in which like parts are designated by like reference numerals throughout the views of the drawings and in which.

DETAILED DESCRIPTION OF THE INVENTION

Figure 1:
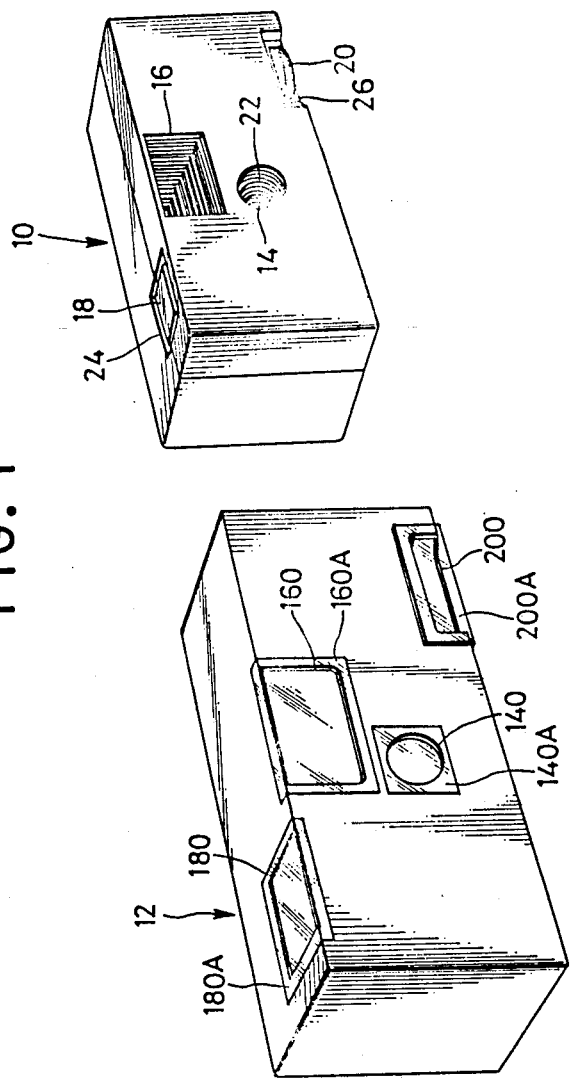
FIG. 1 is an exploded perspective view of the disposable photographic film package of a preferred embodiment of the present invention wherein the internal film casing is shown outside and of the right of the external casing.

Referring now to FIG. 1, there is shown therein a disposable photographic film package (which is hereinafter referred to as a film package for simplicity) of the present invention which is sufficiently cheap to be disposable. The film package comprises a rectangular box-shaped internal film casing 10 with a film cartridge preloaded therein containing a roll of film, and an external film casing 12 in which the internal film casing 10 is encased tightly. The internal film casing 10, which is desirably made of plastic materials, is open at its back and provided with a taking lens 14, a tunnel-like viewfinder 16, a shutter release button 18, and a film advancing knob 20 all of which are well known per se. Surrounding the taking lens 14 is a frusto-conical bore 22 with circular grooves coaxially formed on the inner surface thereof for preventing diffused reflected light from entering the internal film casing 10 through the taking lens 14. There are also grooves formed on the inner surface of the tunnel-like viewfinder 16 so as to prevent diffused reflected light from entering, thereby to provide an easy and clear observation of an object to be photographed.

In the top wall of the internal film casing 10 is an opening 24 with its inner periphery beveled, which receives therein the shutter release button 18 with its top surface flush with, or even below, the outer surface of the top wall of the internal film casing 10. At the bottom of the front wall of the internal film casing 10, there is formed an opening enclosed by a recess 26, which receives therein the film advancing knob 20 without its outer periphery projecting above the outer surface of the front wall of the internal film casing 10.

The internal film casing 10 thus structured has no operating elements projecting outside any outer surface of the walls thereof. Due to the even surface of the internal film casing 10, the internal film casing 10 can be inserted smoothly into the external film casing 12 which will be described in more detail later. Although the outer periphery of the film advancing knob 20 is flush with the outer surface of the internal film casing 10, nevertheless the film advancing knob 20 can be operated easily because of the recess 26 around the opening through which the knob 20 protrudes.

The internal film casing 10 described above is inserted into and packaged tightly in the external film casing 12 which is made of a moistureproof sheet material such as a printable cardboard or a printable thin plastic sheet or the like. A blank for making the external film casing 12 has a very simple flattened shape. The blank, to which printing and/or an ornamental surface pattern can be applied, is formed therein with a circular opening 140 for the taking lens 14, rectangular openings 160 (one of which is hidden) to be aligned with the front and rear windows of the tunnel-like finder 16, a rectangular opening 180 for the shutter release button 18, and a generally rectangular opening 200 for the film advancing knob 20.

These openings 140, 160, 180, and 200 are covered by removable moistureproof sealing sheets 140A, 160A, 180A and 200A, respectively. Although not shown in FIG. 1, in the back wall of the external film casing 12 are provided small rectangular openings for a frame counter window 54 of a pressure plate 36 (see FIG. 2) and a rear window of the tunnel-like viewfinder 16, respectively. These openings are also covered by removable moistureproof sealing sheets.

If the shutter release button 18 is instead disposed in the front wall of the internal film casing 10, the openings can be formed only in the front and rear walls of the external film casing 12. In this case, each front and rear wall of the external film casing 12 may be covered fully by a single thin moistureproof sealing sheet. If only a single sealing sheet is used, the attaching and removing of the sealing sheet from the external film casing is quite easy.

Figure 2:
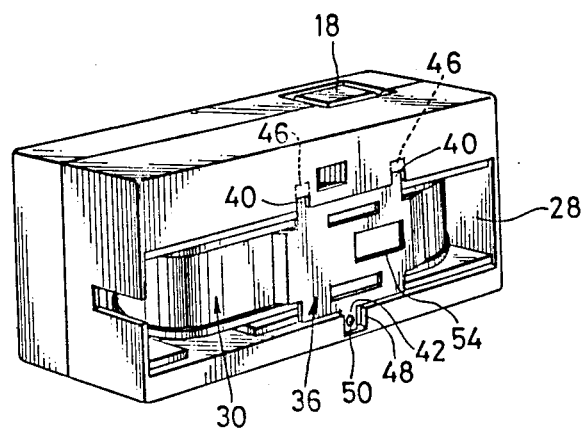
FIG. 2 is a rear perspective view of the internal film casing of FIG. 1 containing therein a film cartridge.
Figure 3:
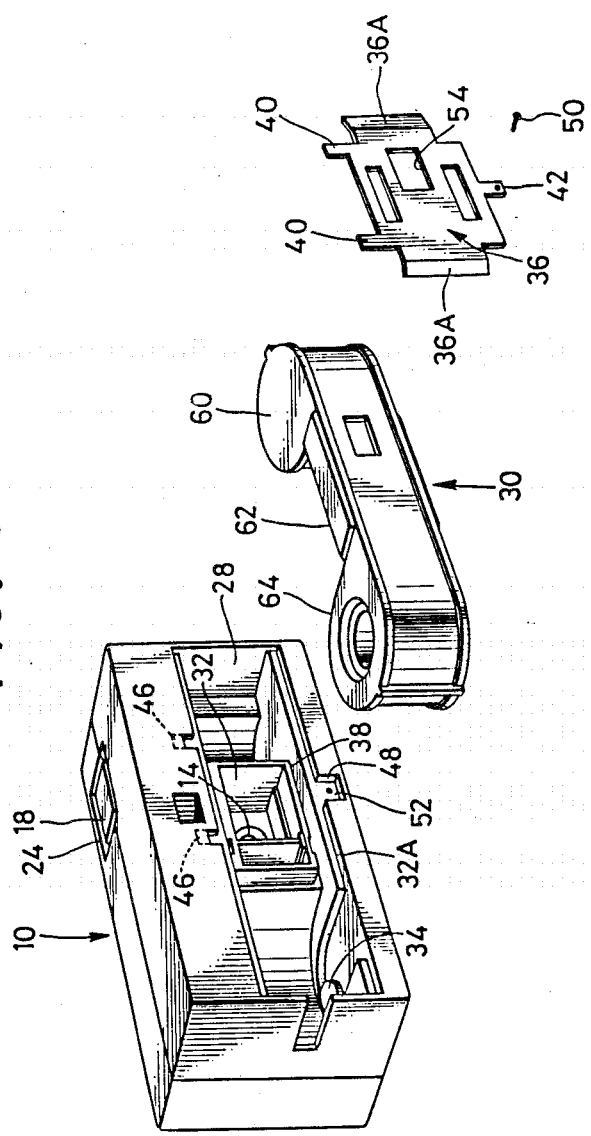
FIG. 3 is an exploded perspective view of the internal film casing and film cartridge and pressure plate of FIG. 2.

Referring to FIGS. 2 and 3, the internal film casing 10 with its open back has a film chamber 28 for receiving a film cartridge 30 containing, for example, a 110-size roll of film therein. The film chamber 28 comprises compartments partly surrounded by curved partition walls on both sides of an exposure chamber 32 which will be described in detail later, each compartment being adapted to receive snugly a cylindrical film chamber 60, 64 of the cartridge 30 to be loaded in the internal film casing 10.

As is well known to those skilled in the art, and as is shown in FIG. 3, the 110-size film cartridge 30 comprises a cylindrical film supply chamber 60, a cylindrical film take-up chamber 64, and a bridge 62 connecting the two cylindrical film chambers 60 and 64 and defining a film supporting plane therebetween for flatly supporting the film from the film supply chamber 60 to the film take-up chamber 64. The bridge 62 is a rectangular box-like chamber defined by upper and lower walls of the bridge and by the cylindrical chambers 60 and 64 and is adapted to fit tightly against the margins of the exposure chamber 32.

Behind the taking lens 14 is a generally rectangular exposure chamber 32 of which the rear periphery 38 lies in the focal plane of the taking lens 14. When the film cartridge 30 is loaded in the internal film casing 10 in such a way as to insert the upper and lower edges of the bridge 62 of the film cartridge 30 into grooves 32A formed between the exposure chamber 32 and the top and bottom inner walls of the internal film casing 10, the rear periphery 38 of the exposure chamber 32 fits against the inside walls of the bridge 62 of the film cartridge 32 and is brought into close contact with the film supported in the film supporting plane of the bridge 62 of the film cartridge 30. The film cartridge 30 is, as is well known, provided with a gear at the bottom of a film wind-up spool (not shown) which is brought into mesh with a gear 34 provided at the bottom of the internal film casing 10 formed integrally with the film advancing knob 20 when the film cartridge 30 is placed in position in the internal film casing 10. Consequently, the film in the film cartridge 30 can be advanced by rotating the film advancing knob 20 one frame after every exposure.

As the internal film casing 10 is open at its back, after the loading of the film cartridge 30, a pressure plate 36 made of a thin sheet metal is attached to the internal film casing 10 in such a way as to press resiliently the bridge 62 of the film cartridge 30 against the rear periphery 38 of the exposure chamber 32 with a predetermined constant pressure so as to form a labyrinth seal between the bridge 62 and the exposure chamber 32, thereby isolating completely the film from ambient light in spite of the internal film casing 10 being open at the back, and also keeping the film flat.

For attaching the pressure plate 36 to the internal film casing 10, the pressure plate 36 is provided with lugs 40 spaced apart a certain distance along its upper edge and a lug 42 at the middle of its lower edge. On both sides of the pressure plate 36 are portions 36A bent slightly inward. To receive this pressure plate, the internal film casing 10 is formed with grooves 46 and a recess 48 at the back thereof. The pressure plate 36 is attached to the internal film casing 10 with the upper lugs 40 in the grooves 46 and the lower lug 42 in the recess 48. The lower lug 42 in the recess 48 is further fastened to the internal film casing 10 by a set screw 50 screwed in a threaded bore 52. Due to the provision of the pressure plate 36, the film cartridge 30 is resiliently pressed by the side bent portions 36A of the pressure plate 36 to bring the bridge 62 of the film cartridge 30 into close contact with the rear periphery 38 of the exposure chamber 32, thereby keeping the inside of the exposure chamber 32 light-tight so as to isolate completely the film from ambient light as well as maintaining the film flat in the focal plane of the taking lens 14.

Figure 4:
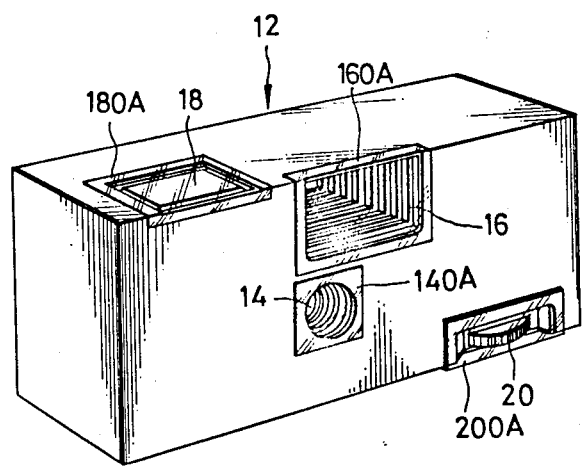
FIG. 4 is a front perspective view of the complete disposable photographic film package of the present invention.

The internal film casing 10 with the film cartridge 30 preloaded therein is encased tightly in the external film casing 12, thereby to provide the disposable photographic film package shown in FIG. 4. As the internal film casing 10 is hidden by the external film casing 12, the internal film casing 10 can have unfinished surfaces. Therefore, the internal film casing 10 can be produced at a low cost. As the operating members such as the shutter release button 18 and the film advancing knob 20 are so incorporated in the internal film casing 10 as to be flush with the outer surfaces of the internal film casing 10, the internal film casing 10 can be inserted into the external camera casing 12 without catching anywhere.

Although the film package described above is formed with a plurality of openings in the external film casing 12, due to the provision of the moistureproof sealing sheets attached to the openings, the film in the film package can be securely prevented from getting moist even if the film package is left as it is for a long time before use.

When using the film package, the moistureproof sealing sheets 140A, 160A, 180A, and 200A are removed to ready the film package for exposure. After the exposure of all the frames of the film in the film cartridge 30, the film package is forwarded to a photo-shop or photo-laboratory to develop the film and make prints therefrom. In the shop or lab, after removing the external film casing 12, the pressure plate 36 is snapped out either with a tool or by hand and then the film cartridge 30 is pulled out. It is not necessary to remove screw 50. The external and internal film casings 10 and 12 with the film cartridge 30 removed are then scrapped.

The external film casing 12 of the above-described embodiment may also comprise a rectangular box-shaped plastic casing that is made of a printable waterproof thin plastic sheet. In this case, the openings 180 and 200 for operating members such as the shutter release button 18 and the film advancing knob 20 are covered with waterproof elastic sealing sheets, for example a thin rubber sheet. Because the elastic sheet can expand and contract, the operating members 18 and 20 can be operated through the elastic sealing sheet.

It is to be noted that, as the distance of depression of the shutter release button 18 is quite short, the sealing sheet for the opening 180 may be of same material as the transparent waterproof plastic sheet of the previous embodiment for the opening 140. The remaining openings 140 and 160 and others are covered by transparent waterproof sealing sheets. Furthermore, the thin rubber sealing sheet attached to the opening 200 may be replaced with an accordion-pleated sealing member made of a thin moistureproof plastic sheet.

It is also to be understood that the film cartridges themselves may take any of various forms well known to those skilled in the art and already commercially available.

Although the present invention has been fully described by way of the preferred embodiments thereof with reference to the accompanying drawings, various changes and modifications will be apparent to those skilled in the art. Therefore, unless otherwise such changes and modifications depart from the scope of the present invention, they should construed as included therein.

What is claimed is:

1. A photographic film package with a taking lens and an operating element comprising:
    a polygonal box-shaped internal film casing with its back open;
    a removable film cartridge in said internal film casing;
    a rectangular box-shaped external casing tightly enclosing said internal film casing, said external film casing having openings for exposing said taking lens and operating element; and
    sealing means covering said openings.

2. A photographic film package as defined in claim 1, wherein said sealing means is a moistureproof plastic sheet.

3. A photographic film package as defined in claim 1, wherein said sealing means is removably attached to said external film casing.

4. A photographic film package as defined in claim 1, wherein said sealing means is transparent.

5. A disposable photographic film package as defined in claim 1, wherein said operating element is a film advancing member.

6. A disposable photographic film package as defined in claim 1, wherein said operating element is a shutter release button.

7. A photographic film package as defined in claim 1, wherein said sealing means comprises a separate waterproof sheet covering each of said openings, each said sheet being substantially smaller than any side of said external casing.

8. A photographic film package as defined in claim 7, in which each said plastic sheet is transparent.

9. A photographic film package as defined in claim 1, in which said operating element is recessed in a flat wall of said internal casing and extends outwardly no farther then the outer surface of said wall.

10. A photographic film package with a taking lens and an operating element comprising:
    a polygonal box-shaped internal film casing with its back open;
    a removable film cartridge in said internal film casing;
    a waterproof rectangular box-shaped external film casing tightly enclosing said internal film casing, said external film casing being provided with an opening allowing access to said operating element; and
    waterproof means sealing said opening.

11. A photographic film package as defined in claim 10, wherein said sealing means is transparent.

12. A photographic film package as defined in claim 10, wherein said operating element is a film advancing member.

13. A photograhic film package as defined in claim 10, wherein said operating element is a shutter release button.

14. A photographic film package as defined in claim 10, wherein said waterproof means comprises a waterproof sheet of a size substantially smaller than any wall of said external casing.

15. A photographic film package as defined in claim 14, wherein said sheet is transparent.

16. A photographic film package as defined in claim 10, in which said operating element is recessed in a flat wall of said internal casing and extends outwardly no farther than the outer surface of said wall.

* * * * *